(12) United States Patent
Khalfallah et al.

(10) Patent No.: US 6,744,941 B2
(45) Date of Patent: Jun. 1, 2004

(54) OPTICAL WAVELENGTH TUNABLE FILTER

(75) Inventors: Sabry Khalfallah, Paris (FR); Joel Jacquet, Limours (FR)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 10/414,157

(22) Filed: Apr. 16, 2003

(65) Prior Publication Data

US 2003/0198435 A1 Oct. 23, 2003

(30) Foreign Application Priority Data

Apr. 18, 2002 (FR) .............................. 02 04865

(51) Int. Cl.⁷ .............................. G02B 6/12; H01S 3/00
(52) U.S. Cl. .............................. 385/14; 385/37; 385/28; 385/31; 385/38; 385/88; 359/346; 359/337.2; 398/82; 398/85
(58) Field of Search .............................. 385/14, 27, 28, 385/31, 38, 88, 92; 359/346, 337.2; 398/82, 85

(56) References Cited

U.S. PATENT DOCUMENTS

| | | | |
|---|---|---|---|
| 2002/0181516 A1 * | 12/2002 | Kamath | 372/20 |
| 2003/0016907 A1 * | 1/2003 | LoCascio et al. | 385/27 |
| 2003/0086448 A1 * | 5/2003 | Deacon | 372/20 |
| 2003/0086449 A1 * | 5/2003 | Jacquet et al. | 372/25 |
| 2003/0198435 A1 * | 10/2003 | Khalfallah et al. | 385/37 |

OTHER PUBLICATIONS

Beatriz Ortega, "WDM Grid Tunable Filter Based on a Sampled Fibre Grating and a FFP", European Conference on Optical Communication (EOC '98), Sep. 20–24, 1998, pp. 291–292, XP002225807.

B. Ortega et al, "Wavelength Division Multiplexing All–Fiber Hybrid Devices Based on Fabry–Perot's and Gratings", Journal of Lightwave Technology, IEEE, NY, US, vol. 17, No. 7 Jul. 1999, pp. 1241–1247 XP000898387.

J. Capmany et al, "Fibre Optic bandpass Filter with subpicometre bandwidth Using a fibre grating and two fibre Fabry–Perot filters" Electronics Letters, IEE Stevenage, GB, vol. 33, No. 23 Nov. 6, 1997, pp. 1970–1972, XP006008153.

B. Ortega et al, "Experimental demonstration of an ultraselective and tunable optical bandpass filter using a fibre gratin and a Fabry–Perot", Electronics Letters, IEE Stevenage, GB, vol. 33, No. 8, Apr. 10, 1997, pp. 669–671 XP006007311.

S. Li et al, Fast Accurate Wavelength Switching of an Erbium–Doped Fiber Laser with a Fabry–Perot Semiconductor Filter and Fiber Bragg Gratings, Applied Physics Letters, American Institute of Physics, NY. US, vol. 77, No. 26, Dec. 25, 2000, pp. 4268–4270, XP000994361.

* cited by examiner

*Primary Examiner*—Brian M. Healy
(74) *Attorney, Agent, or Firm*—Moser, Patterson & Sheridan, L.L.P.

(57) ABSTRACT

The wavelength tunable optical filter (1) comprises a resonant cavity (4) delimited by two opposite reflective elements (8, 8') which are not wavelength selective, and a reflector (7) external to the cavity (4).

The external reflector (7) exhibits transmission peaks for an integer number N of optical frequencies and the Fabry-Perot cavity (4) delimiting a phase tuning section (11) is sized so that the distance between the optical frequencies of any two resonant modes of the cavity (4) is never equal to the difference between the optical frequencies of any two transmission peaks of the external reflector (7).

8 Claims, 3 Drawing Sheets

OPTICAL WAVELENGTH TUNABLE FILTER

The present invention relates to a wavelength tunable optical filter for, rapidly and over a broad spectral band. The use of such optical filters is particularly advantageous in the field of optical telecommunications which use wavelength multiplexing, normally referred to as "WDM" (the acronym for the expression "Wavelength Division Multiplexing") or "optical frequency division multiplexing".

Devices for selecting one or more optical frequencies from an input WDM signal are already known. However, none of the conventional tunable filter technologies based for example on the variation of a cavity length by moving a mechanical piece makes it possible to obtain switching times of less than a millisecond or at best a microsecond.

In fact, in the context of rapid frequency selection for switching optical packets requiring switching speeds situated in the nanosecond range, the only solution existing at the present time is based on frequency selection devices which use optical amplifiers utilized as open or closed optical gates.

A particular architecture of such a frequency selection device is described in U.S. patent application Ser. No. 2003/0002102, published on Jan. 2, 2003. In this document a description is in particular given of a device for selecting frequency division multiplex channels, an example of functioning of which, for a number of channels equal to N, respectively $f_1$ to $f_N$, is shown in FIG. 1.

Thus the channel selector according to D1 comprises a first 1×n cyclic demultiplexer Demux for demultiplexing the input multiplex as n interleaved frequency combs each consisting of m channels. The demultiplexer used is a 1 to n de-interleaving multiplexer based for example on filters of the Mach-Zehnder type, on etched gratings or on waveguide gratings of the AWG type (standing for "Array Waveguide Grating"). A second m×m cyclic demultiplexer Demux' used as a router and consisting for example of an etched grating or a waveguide grating is provided for separating the channels of the interleaved combs. This second cyclic demultiplexer Demux' comprises n input ports connected respectively to the output ports of the first demultiplexer Demux by means of a first array composed of n optical switches Ii, with i between 1 and n. Each of the optical switches Ii composing the first array inserted between the two demultiplexers Demux and Demux' is advantageously formed by an optical amplifier. The frequency selector according to D1 also comprises a first m×m cyclic multiplexer Mux' used as a router, the m input ports of which are connected respectively to the m output ports of the second m×m cyclic demultiplexer Demux' by means of a second array composed of m optical switches (formed by optical amplifiers) Ij, with j between 1 and m. The m×m cyclic multiplexer Mux' is finally cascaded with a second n×1 cyclic multiplexer Mux so as to recover the selected channel or channels on a single output port OF of the device.

In fact, depending on whether the optical switches composing the arrays of optical switches inserted respectively between the 1×n multiplexer Demux and the m×m demultiplexer Demux' and between the m×m demultiplexer Demux' and the m×m multiplexer Mux' are switched on or off, it is possible to select and route the required frequency fi ($1 \leq i \leq N$) of the input multiplex intended for the single output port OF of the device.

In order to obtain the required functioning of the device, the numbers n and m must be prime with each other (and N=n×m, with n<m) and the components Demux, Demux', Mux and Mux' must be designed to function with the same spectral spacing between channels Δf.

The configuration of the frequency selector illustrated in FIG. 1 therefore makes it possible to implement the selection of the required frequency amongst N channels by means of the activation of a first optical amplifier amongst the n making up the first array and a second optical amplifier amongst the m making up the second array.

Thus, in the frequency selection device of FIG. 1, the values of the frequencies processed are predetermined by the multiplexers and demultiplexers used, which ensures stability in terms of frequency, no tuning having to be carried out.

In addition, the device of FIG. 1 ensures the rapid selection of frequency. This is because the switching elements used, typically optical amplifiers, are elements which are intrinsically rapid since switching times of around a nanosecond can be achieved by such elements.

However, this solution has drawbacks. This is because, even if the architecture of the frequency selector according to FIG. 1 makes it possible to dispense with the need for using as many active elements, in this case optical amplifiers, as there are channels to be processed, it nevertheless involves using a consequent number of active elements. The device in FIG. 1 consequently occupies a large amount of space (for example a surface area of around 4.5×4.5 mm² for a conventional 16-channel frequency selector).

Equally it is necessary to provide as many electronic control elements as there are active elements. This is because, the activated optical amplifier not always being the same according to the frequency which it is wished to select, it is necessary to integrate in the device an electronic control chip for each of the optical amplifiers used. This involves in addition providing the fitting of many electrical connections and the necessary power supplies. Thus the use of the component in FIG. 1 will require a complex electronic card of large size.

Consequently one object of the present invention is to mitigate the above-mentioned drawbacks by proposing a rapidly tunable optical filter, that is to say one with very short tuning times, over a wide range of optical frequencies, in order to precisely obtain any one of the frequencies in the ITU (International Telecommunication Union) grid with a small spacing between consecutive frequencies of 50 or 100 GHz, and this by acting on only one control quantity, thus affording simplified control electronics.

The invention aims in particular to propose an optical filter combining the advantages set out above, whilst being very compact.

To this end, the invention makes provision for using first of all a Fabry-Perot cavity, that is to say a region delimited by two opposite reflective elements which are not selective in terms of wavelength and whose resonant modes are adjustable by electro-optical effect. Typically, an electrical field is applied to a PIN waveguide junction whose effective index is modified, according to the value of the electrical field, by virtue of a Franz-Keldish electro-optical effect or a quantum confined Stark electro-optical effect. The optical length of the Fabry-Perot cavity can thus be adjusted so as to be able to obtain the optical frequency values corresponding to the resonant modes of the Fabry-Perot cavity over the entire adjustment range $\Delta f_T$ required.

The Fabry-Perot cavity is optically coupled to an external reflector having a reflectivity which is selective in terms of frequency. This reflector consists for example of a sampled Bragg grating waveguide ("SGW", standing for "Sampled Grating Waveguide"). The sampled Bragg grating waveguide can be photo-written in a fiber ("SFBG", standing for "Sampled Fiber Bragg Grating"), but any other waveguide can be used, in particular silica planar circuits or devices based on polymers. The sampled grating is designed so as to have N transmission peaks over the entire adjustment range mentioned above.

Such a device therefore comprises a first Fabry-Perot cavity with an operating mode adjustable by an electro-optical effect which can be controlled, coupled to a second external cavity.

Its operating principle is as follows. The optical frequency able to be transmitted by this set of two cavities coupled to each other is the frequency of the resonant mode of the Fabry-Perot cavity which best coincides with that of one of the transmission peaks of the external reflector. By changing the resonance conditions of the first cavity by acting on a control voltage determining the value of the electrical field in the phase tuning part, a sliding of the comb of the resonant modes of the first cavity causes a change in coincidences between on the one hand the optical frequencies of the resonance comb of the cavity and on the other hand the optical frequencies of the comb of the transmission peaks. Any new coincidence causes a mode jump and a transmission window then shifts to the new resonant frequency which coincides with another frequency value corresponding to a transmission peak of the sampled Bragg grating waveguide.

More precisely, the invention concerns a wavelength tunable optical filter, comprising a Fabry-Perot resonant cavity delimited by two opposite reflective elements not wavelength selective, and a reflector external to the said cavity, characterized in that the said external reflector exhibits transmission peaks for an integer number N of optical frequencies, and in that the said Fabry-Perot cavity delimits a phase tuning section and is sized so that the difference between the optical frequencies of any two resonant modes of the said cavity is never equal to the difference between the optical frequencies of any two transmission peaks of the said external reflector.

Thus, the resonant cavity being delimited by reflective elements not selected for wavelength, the cavity is strictly of the "Fabry-Perot" type. The difference between the frequencies of any adjacent resonant modes is then practically a constant imposed essentially by the compositions and dimensions of the elements constituting the cavity. However, by varying its optical length by means of the phase tuning section, a sliding of the comb of the resonant frequencies of this cavity is caused.

The reflectors delimiting the cavity not being totally reflective, a wave will be able to pass through the entire cavity and external reflector if the latter has a transmission peak which coincides with one of the resonant modes of the cavity. As the cavity is designed so that the difference between the optical frequencies of any two resonant modes is never equal to the difference between the optical frequencies of any two transmission peaks of the reflector, a simple adjustment of the phase tuning section makes it possible to selectively make only one of the frequencies corresponding to the transmission peaks coincide with one of the resonant frequencies of the cavity and it is this single coincident frequency which will be transmitted.

In the particular case, important in practice, where the difference between any two adjacent optical frequencies of transmission peaks is constant, provision will also advantageously be made for the optical frequencies of the transmission peaks to be interleaved with consecutive optical frequencies of resonant modes. This arrangement, still obtained by an appropriate sizing of the Fabry-Perot cavity, permits adjustment ranges where the frequency value (or wavelength value) selected is a monotonic function of the voltage applied. This therefore simplifies the control of the phase tuning section.

Preferably, in the latter case, the ratio of the difference between two adjacent optical frequencies of resonant modes to the difference between two adjacent optical frequencies of transmission peaks will be chosen so as to be equal to $N/(N-1)$. This arrangement ensures that the change from one frequency value selected to the following takes place by a sliding of the comb of the resonant modes according to a constant period. The result is an identical selectivity over the entire adjustment range.

In a preferred embodiment, the external reflector is a waveguide comprising at least one sampled Bragg reflective grating optically coupled to the first cavity.

Other characteristics and advantages of the present invention will emerge more clearly from a reading of the following description given by way of illustrative and non-limiting example and made with reference to the accompanying figures, in which.

Figure 4:
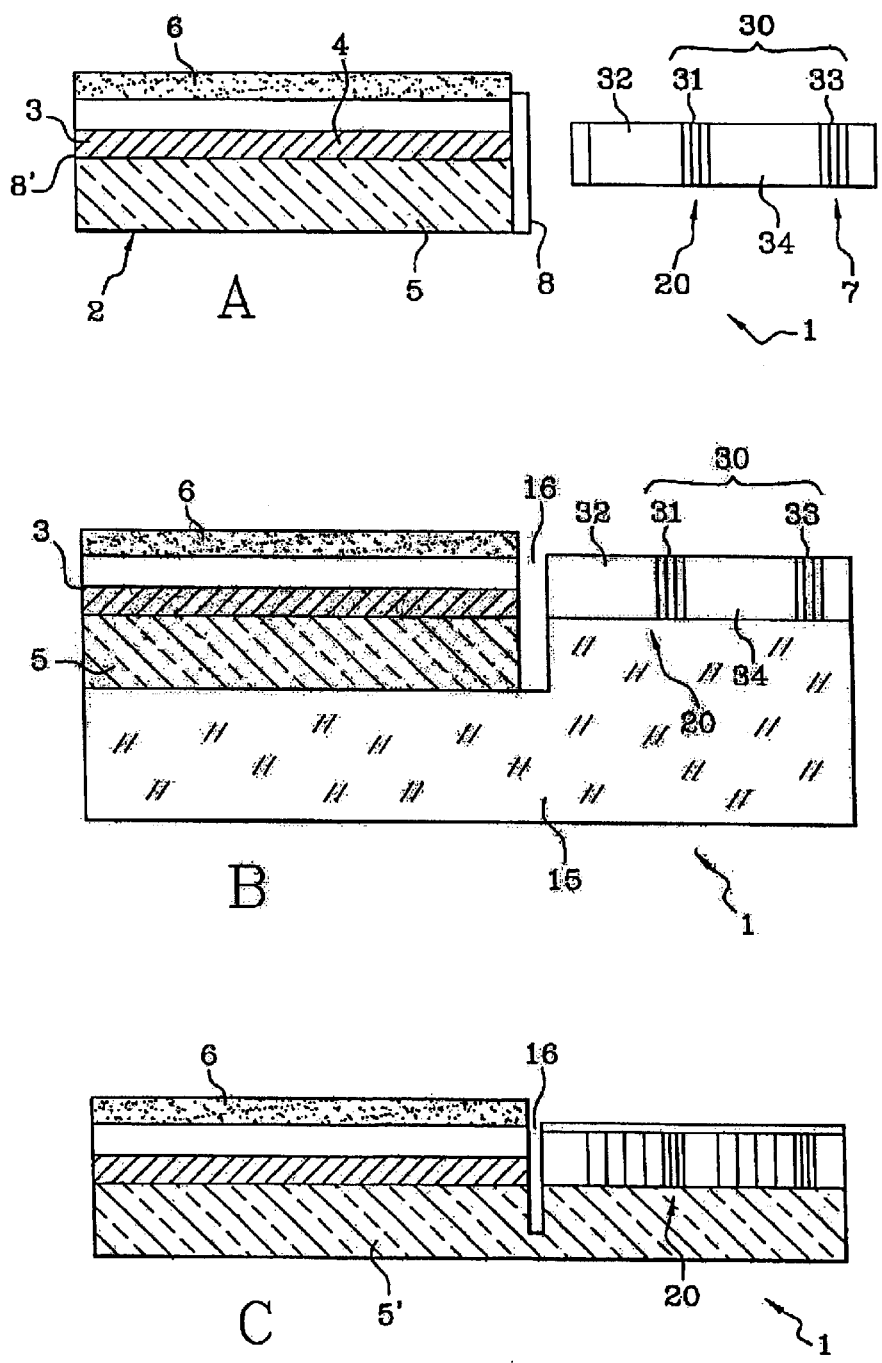

FIG. 4 comprises parts A, B and C representing various embodiments and coupling modes between the sampled Bragg grating waveguide (SGW) and the first cavity.

Figure 2:
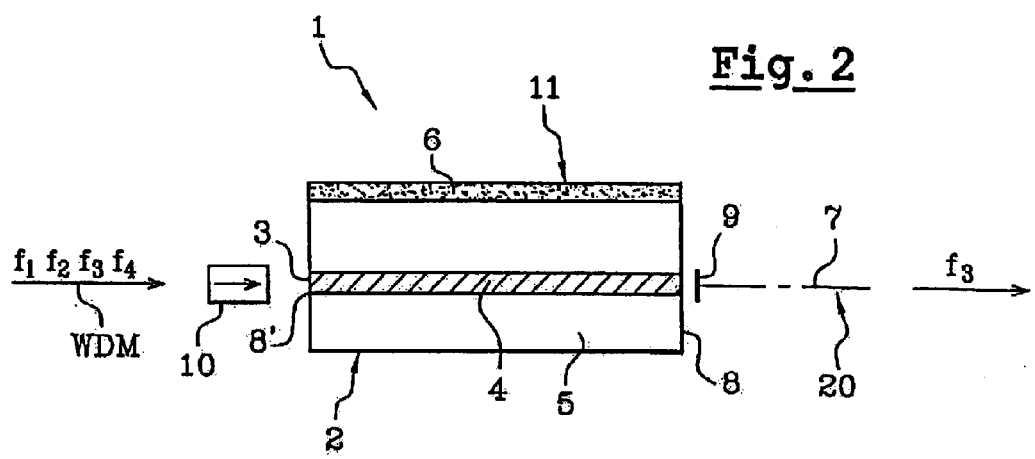
FIG. 2 depicts a general embodiment of the invention.

FIG. 2 therefore shows a general embodiment of a tunable optical filter 1 according to the invention. A semiconductor device 2 constitutes a Fabry-Perot cavity 4 and comprises a layer 3 which forms a waveguide core integrated on a single substrate 5 made from InP and buried in a manner known per se in electrical and optical confinement layers, not referenced in the figures.

The layer 3 is produced from a material able to exhibit an electro-optical effect, for example a Franz-Keldish effect or a quantum confined Stark effect. A metallic contact layer 6, for example made from AuPt, is situated above the confinement layers and constitutes an electrode designed to receive a peculiar command in the form of a voltage applied between this and a bottom electrode, not shown.

Thus the Fabry-Perot cavity in fact delimits a phase tuning section 11 and the optical length of the Fabry-Perot cavity 4 can be modified by applying a voltage command to the metallic layer 6 serving as a phase tuning electrode. This is because, according to the value of the electrical field, the effective index of the phase tuning section 11 is modified, by virtue of the Franz-Keldish or quantum confined Stark electro-optical effect, according to the structure and composition of the layer 3.

The Fabry-Perot cavity 4 is optically coupled to a reflector 7 forming, with the first cavity 4, a second external cavity. In FIG. 2, the reflector is represented in a general form by an axis line 7. It will be seen below with reference to FIG. 4 that the reflector 7 is in the form of a waveguide 20 comprising at least one sampled Bragg reflective grating 30 consisting of an alternation of samples of distributed reflective Bragg gratings 31, 33 . . . and Fabry-Perot sections 32, 34 . . . , each consisting of a uniform waveguide part without a Bragg grating. It will be seen below that, in one advantageous embodiment, making it possible to reduce the total length of the waveguide part carrying the sampled Bragg grating, several sampled gratings are interleaved on the same guide portion.

The whole of the sampled grating is intended to produce an intrinsically stable transmission peak comb, each peak corresponding to a frequency to which the Fabry-Perot cavity 4 can be tuned. It should be noted that the transmission peaks of the reflector 7 must be fine and of the same type as the transmission peaks of the Fabry-Perot cavity 4.

According to a preferred embodiment, the first Fabry-Perot cavity 4 is formed between a semi-reflective rear face 8' of the active layer 3 and the front face 8 of this same layer, which then carries a semi-reflective mirror. The coefficient of reflection of an input 9, for example a lens, of the reflector 7 must be as close to 0 as possible so as to avoid the formation of a third cavity. As for the reflective rear face 8', this preferably has a reflectivity of around 50%.

The tunable filter 1 is designed to receive a WDM signal as an input, composed in the example in FIG. 2 of the frequencies $f_1$ to $f_4$. An isolator 10 is then advantageously disposed at the input of the tunable filter 1 so as to prevent some of the light reflected by the rear face 8' from starting off again in the entry fiber and thus creating uncontrolled disturbances.

Figure 3:
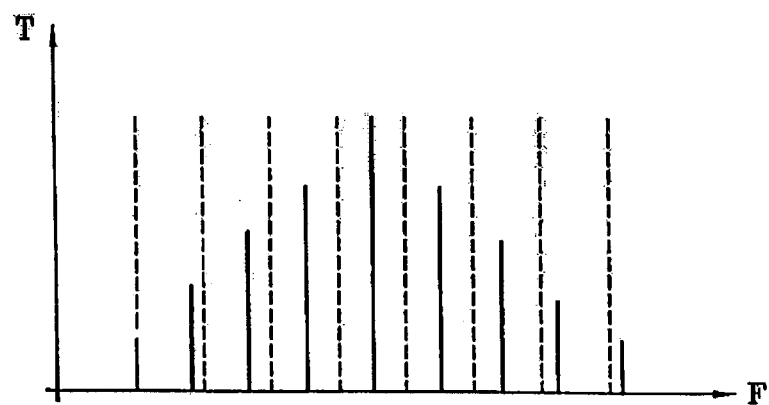
FIG. 3 illustrates the interleaving of the resonant frequency values of the Fabry-Perot cavity and the frequency values of the transmission peaks of the external reflector.

FIG. 3 depicts the spacing and interlacing of the values of the frequencies of the resonant modes of the Fabry-Perot cavity 4, in broken lines, and frequency values corresponding to the various transmission peaks of the reflector 7, in solid lines. The frequencies are entered on the X axis and the values relating to the coefficient of transmission of the peaks are entered on the Y axis. The reflector 7 has transmission peaks for an integer number N of frequencies determining N−1 frequency intervals each bounded by two frequency values. The values of the frequencies of the transmission peaks are interleaved with frequency values corresponding to resonant modes of the Fabry-Perot cavity 4, so that a frequency value corresponding to a resonant mode of the Fabry-Perot cavity 4 is present on each interval between two consecutive transmission peak frequency values of the reflector 7. The Fabry-Perot cavity 4 is therefore here designed to have at most N−1 resonant frequency values lying between the extreme transmission frequency values of the reflector 7.

By changing the voltage value applied to the phase tuning section 11, the effective index of the phase tuning section and therefore its optical length are changed. The sliding of the resonance modes of the Fabry-Perot cavity 4 thus obtained makes it possible for a resonant frequency of the cavity 4 situated in a frequency range lying in one of the N−1 frequency intervals delimited by the transmission peaks of the reflector 7 to move towards one of the two values delimiting this interval.

By making provision for the difference between the frequencies of any two resonant modes of the said cavity never to be equal to the difference between the optical frequencies of any two transmission peaks of the reflector 7, the two combs are designed to allow only one superimposition of a frequency of a resonant mode with that of a transmission peak.

It is now possible to pass from a first operating mode in which the filter 1 allows only a frequency corresponding to a first transmission peak of the reflector 7 to pass, to a second operating mode in which the filter 1 allows another frequency to pass, and only this frequency, corresponding to a second transmission peak of the reflector 7. There is therefore only one frequency able to pass through the filter 1.

If in addition the ratio of the difference between two adjacent optical frequencies of two resonant modes to the difference between two adjacent optical frequencies of transmission peaks is chosen so as to be equal to N/(N−1), the passage from one frequency value selected to the following always takes place by a sliding of the comb of the resonant modes by one step. Thus an even monotonic translation of the coincidences between frequency values of resonance modes of the first cavity and frequency values of transmission peaks of the external reflector is obtained.

Information is given below on the orders of magnitude to be taken into consideration for implementing the invention.

If L and $n_{eff}$ designate respectively the length and effective index of the Fabry-Perot cavity, the spacing of the resonance modes of the cavity is given by the formula $$\Delta\lambda_{FP}=\lambda^2/(2.n_{eff}L)$$

in which $\Delta\lambda_{FP}$ represents the spacing between two consecutive resonance wavelength values of the cavity 4.

For a value of $n_{eff}$ close to 3.2, this results, for 40 channels with a spacing of 100 GHz between consecutive channels, in a cavity whose length is around 460 μm. With a spacing of 50 GHz, this length would be approximately 920 μm.

The variation in index to be implemented in order to cover all the channels must correspond to at least one spacing between consecutive channels (either 50 GHz or 100 GHz) and is given by the formula $$\Delta n=\lambda/2L$$

If for example the variation which can be obtained by a Franz-Keldish effect is $\Delta n=5.10^{-3}$, this results in a wavelength L for the Fabry-Perot cavity of at least 150 μm in order to cover all the channels.

The number of resonant frequencies of the Fabry-Perot cavity is determined by the length L of the cavity. The precision on the spacing between consecutive channels depends on the precision with regard to the step of splitting of the transverse faces of the cavity, which is in general 5 μm more or less with respect to the required length. The variation $d\Delta\lambda$ in the spacing between consecutive resonance wavelengths according to the variation dL in the length of the cavity can be expressed by:

$$d\Delta\lambda=2.dL.(\Delta\lambda_{FP}/\lambda)^2$$

Thus, for a spacing of 50 GHz between consecutive channels, the precision of the spacing of the resonant frequencies of the cavity 4 is less than 1 GHz. Such a small difference can easily be compensated for by acting on the voltage control applied to the phase tuning section 11.

Examples of particular embodiments of a waveguide 20 and sampled gratings 30 are now described with reference to FIG. 4. In this figure, the elements already described with reference to FIG. 2 will not be described again. FIG. 4 comprises three parts A, B and C. In part A, the sampled grating 30 of reflective distributed Bragg gratings 31, 33 . . . (SGDBR) is produced on a waveguide 20 consisting of an optical fiber. The coefficient of reflection R1 of the split face 8 of the layer 3 facing the optical fiber 20 must be adapted for low coupling losses, whilst the coefficient of reflection R2 at the input of the fiber must be zero in order to avoid creating a third cavity. The separation between the first Fabry-Perot cavity 4 and the entry of the fiber 20 can be around several tens of microns. It is necessary to take account of this distance in calculating the phase difference of the wave reflected by the reflector 7.

In FIG. 4 part B, the waveguide 20 is a polymer or silica waveguide. It is possible in this case to mount the semiconductor 2 where the Fabry-Perot cavity 4 is produced and the guide 20 on a common substrate 15, for example made from silicon, using a technique of auto-alignment between the various components.

In FIG. 4 part C, the waveguide 20 is an InP waveguide which can be produced on a substrate 5' common to the Fabry-Perot cavity 4 and to the guide 20.

The separation of the cavity 4 and guide 20 can be achieved in cases B and C by an etching 16 forming the mirror of the face 8 situated opposite the entry to the guide 20.

The way of manufacturing sampled reflective gratings is well known in the field of optical components for producing filters having close reflection peaks in accordance with any given range. The implementation of the invention which requires producing filters having close transmission peaks can also use sampled reflective gratings. For more details reference can for example be made to the book entitled "Fiber Bragg Gratings", by Raman Kashyap, published by Academic Press, 1999. The case of gratings having transmission peaks is dealt with in Chapter 6.1 (see in particular FIG. 6.9, page 238).

In practice, for manufacturing facilities, it is preferable to produce a sampled grating on a fiber as depicted in FIG. 4A or on a silica or polymer waveguide as in FIG. 4B. In particular, in the case of silica waveguides, in addition to the well known advantages of these guides, low losses, well controlled technologies and reliability, it should be noted that the optical index of these guides can be adjusted continuously by a procedure of uniform illumination of the guide. This adjustment of the value of the index n allows a fine adjustment of the spacing of the frequencies of the transmission peaks. The sampled grating can also be integrated on an InP waveguide as depicted in FIG. 4C.

Figure 1:
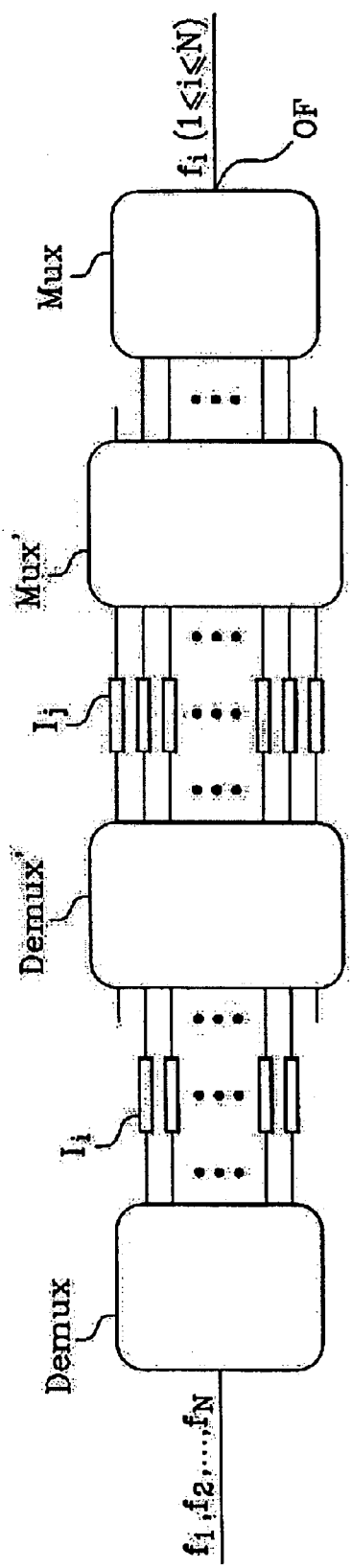
FIG. 1 is a diagram illustrating a frequency selection device according to the prior art and has already been described.

The tunable filter according to the invention therefore combines many advantages, including its compactness. This is because it was seen, with reference to the prior art (FIG. 1), that a conventional frequency selector occupied a surface area of 4.5×4.5 mm$^2$, whilst the filter presented here consists of a Fabry-Perot cavity of around 200×400 $\mu$m$^2$ associated with a silica waveguide 2 mm long or with a fiber of a few centimeters. A conventional InP wafer could therefore integrate more than 200 times more tunable filters according to the present invention than conventional frequency selectors.

Another advantage of the invention lies in the simplicity of the tuning control and of the electronics associated with it. This simplicity results in the fact that the tuning is obtained by action on only one control quantity, in this case the control voltage applied to the tunable-phase section.

Finally, the tuning is achieved very rapidly. The speed of implementation of the tunings is in fact due to the combined effect of the use of an electro-optical effect which is intrinsically very rapid and the simplicity of the control electronics.

What is claimed is:

1. A wavelength tunable optical filter (1), comprising a Fabry-Perot resonant cavity (4) delimited by two opposite reflective elements (8, 8') not wavelength selective, and a reflector (7) external to the said cavity (4), characterized in that the said external reflector (7) exhibits transmission peaks for an integer number N of optical frequencies, in that the said Fabry-Perot cavity (4) delimits a phase tuning section (11) and is sized so that the difference between the optical frequencies of any two resonant modes of the said cavity (4) is never equal to the difference between the optical frequencies of any two transmission peaks of the said external reflector (7).

2. A tunable optical filter (1) according to claim 1, characterized in that, the difference between any two adjacent optical frequencies of transmission peaks being constant, the optical frequencies of the said transmission peaks are interleaved with consecutive optical frequencies of resonant modes.

3. A tunable optical filter (1) according to claim 2, characterized in that the ratio of the difference between two adjacent optical frequencies of two resonant modes to the difference between two adjacent optical frequencies of transmission peaks is equal to N/(N−1).

4. An optical filter (1) tunable for frequency according to claim 1, characterized in that the external reflector (7) is a waveguide (20) optically coupled to the Fabry-Perot cavity (4) and comprising at least one sampled reflective Bragg grating (30) consisting of an alternation of samples (31, 33) of distributed reflective Bragg gratings and Fabry-Perot sections (32,34).

5. A tunable optical fiber (1) according to claim 1, characterized in that the effective index of the phase tuning section (11) is adjustable by electro-optical effect by changing a voltage value applied to the said phase tuning section (11), allowing a sliding of the resonance modes of the Fabry-Perot cavity (4).

6. A tunable optical filter (1) according to claim 5, characterized in that the variation in the effective index of the phase tuning section (11) is obtained by Franz-Keldish electro-optical effect.

7. A tunable optical filter (1) according to claim 5, characterized in that the variation in the effective index of the phase tuning section (11) is obtained by quantum confined Stark electro-optical effect.

8. A tunable optical filter (1) according to claim 1, characterized in that it also comprises an isolator (10) disposed at its entry.

* * * * *